United States Patent

[11] 3,607,149

[72] Inventors James M. Rice;
Irving J. Hutkin, both of San Diego, Calif.
[21] Appl. No. 513,637
[22] Filed Nov. 10, 1965
[45] Patented Sept. 21, 1971
[73] Assignee Dynasciences Corporation
Blue Bell, Pa.
by said Rice

[54] HIGH-TEMPERATURE MAGNETIC RECORDING TAPE
4 Claims, No Drawings

[52] U.S. Cl. .......... 29/196, 29/199, 29/183.5
[51] Int. Cl. .......... B32b 15/00
[50] Field of Search .......... 29/196.3, 199, 196.6, 195, 194; 117/234, 239, 240, 121; 179/100.2 A

[56] References Cited

UNITED STATES PATENTS

| | | | |
|---|---|---|---|
| 2,514,873 | 6/1950 | Keene | 29/196.3 X |
| 2,871,550 | 2/1959 | Weinberg | 29/194 X |
| 3,150,939 | 9/1964 | Wenner | 117/240 X |
| 3,180,715 | 4/1965 | Simon | 29/194 |
| 3,113,845 | 12/1963 | Uchida | 29/195 |
| 3,249,409 | 5/1966 | McLeod | 29/199 |
| 3,290,126 | 12/1966 | Monson | 29/196.6 |
| 3,411,892 | 11/1968 | Sasaki | 29/194 X |
| 3,393,982 | 7/1968 | Fisher | 29/194 |

*Primary Examiner*—Hyland Bizot
*Attorney*—Donald E. Nist

ABSTRACT: This patent describes a high-temperature magnetic recording tape comprising a nonmagnetic substrate, adhered to said substrate an intermediate barrier layer for resisting the diffusion of foreign elements from the substrate, and adhered to said intermediate barrier layer a magnetic coating layer adapted to receive and retain recorded information, said magnetic coating layer being at least 10$\mu$ inches thicker than the total thickness of all other layers on said substrate.

HIGH-TEMPERATURE MAGNETIC RECORDING TAPE

This invention relates to a magnetic recording tape which will retain recorded information during and after exposure to high temperatures.

The magnetic recording tape has as its principal function to accept and retain magnetic signals (information). However, it is known that magnetic recording tape upon exposure to high temperatures tends to lose the information recorded thereon. The loss of the recorded magnetic information can be the result of solid diffusion of foreign elements into the magnetic recording from the substrate, grain growth induced by the elevated temperature exposure, transformation of crystalline form, thermal agitation, or oxidation of the magnetic coating by exposure to high-temperature oxidizing environments.

Heretofore, the magnetic recording tapes adapted for use at elevated temperature were of the precipitation hardened type generally consisting of vanadium, iron and cobalt. These tapes are usually prepared by solution heat, and then aged to allow precipitation to occur. This treatment affords mechanical hardening together with the development of good magnetic properties. However, tapes produced by this process are expensive. Moreover, it has been found that tapes subjected to this treatment become brittle and have a high breakage frequency during usage.

It is an object of this invention to provide a novel magnetic recording tape.

Another object of this invention is the provision of a magnetic recording tape particularly adapted to retain recorded information upon exposure to elevated temperature.

These and other objects of the invention will be apparent from the more detailed description which follows.

The novel magnetic recording tape of this invention comprises at least two superposed layers on a substrate. The first layer adhered to the substrate is an intermediate barrier layer. To the intermediate barrier layer is adhered the magnetic coating layer adapted to receive and retain recorded information. Another layer may be overcoated and adhered to the magnetic coating layer as an oxidation resistant barrier layer. The presence of this layer, while not required, represents a preferred embodiment of our invention.

The substrate for the magnetic recording tape of this invention may be substantially nonmagnetic metallic or nonmetallic material, such as copper, silver or stainless steel, ceramic or plastic. Stainless steel is the preferred substrate. The thickness of the substrate is not critical, and is generally on the order of about 1,000 $\mu$ inch. The intermediate barrier layer resists the diffusion of foreign elements into the magnetic coating layer from the substrate, and is selected such that it will adhere to the substrate and also accept the magnetic coating layer. Preferably the intermediate barrier layer is of such composition that it can be reacted with the magnetic coating layer by the application of heat to form an intermetallic compound which is thermally stable at elevated temperatures. Illustrative of suitable intermediate barrier layers are zinc, tin, cadmium, silver, cobalt, gold, platinum, palladium, mixtures of zinc and nickel, zinc and tin, tin and nickel, cadmium and nickel, zinc and cobalt, tin and cobalt, and cadmium and cobalt.

The magnetic coating layer is generally cobalt or one of the other magnetic materials formed by electroless plating and described in Pat. application Ser. No. 21,329, which is incorporated herein by reference. The oxidation-resistant barrier may be, for example, zinc, tin, cadmium, silver, gold, platinum, chromium, mixtures of tin and nickel, zinc and nickel, zinc and tin, cadmium and nickel, zinc and cobalt, tin and cobalt and cadmium and cobalt. In general, chromium and tin are the preferred oxidation-resistant barrier layer materials. The oxidation resistant barrier furnishes an oxygen-impermeable barrier between the magnetic coating layer and the atmosphere. The layer also provides a substantial degree of wear resistance, which prevents damage to the magnetic coating layer when the tape passes through guide roller and heads.

The thickness of the substrate and the adhered coating is not critical. However, it is preferred, for example, that when the oxidation resistant barrier layer is present, it be relatively thin so as to not impair the reading and writing of the magnetic coating layer. In general, the thickness of the coating layers are as follows:

Intermediate barrier layer—at least 2 to 100 $\mu$ inches or more

Magnetic coating layer—at least 10 to 200 $\mu$ inches or more

Oxidation resistant barrier layer—at least 10 to 50 $\mu$ inches or more

In any event, the magnetic coating layer should generally be at least 10 $\mu$ inches thicker than the intermediate barrier layer; or where the oxidation resistant barrier layer is also present, at least 10 $\mu$ inches thicker than the combined thickness of these two layers.

The intermediate barrier layer may be applied to the substrate layer by electroplating. The magnetic coating layer may be then also applied by electrochemical means, for example, by immersing in the electroless plating bath. The oxidation resistant barrier layer may be applied by electroplating. The techniques and procedures involved in the application of individual metals by electroplating are well known to those skilled in the art, and thus form no part of this invention. Accordingly, further discussion of these techniques is not believed to be required. The application of the magnetic coating layer is preferably performed in the manner described in the copending patent application referred to above.

It has been found that among the tapes of our invention, the highest level of signal retention at elevated temperatures is obtained by initially heating the tape having an intermediate barrier layer and/or oxidation resistant barrier layer containing zinc, tin, cadmium or cobalt, and a magnetic coating layer containing cobalt. While not bound by any theory, it is believed that in the presence of heat, zinc, tin, cadmium, cobalt, or any other metal forming a brass-type cubic structure, reacts with the cobalt in the magnetic coating to form a highly stable intermetallic compound. In the preferred embodiment, it has been found that even though tin normally melts at about 250° C., when it is used as the intermediate barrier layer or the oxidation resistant layer, good thermal stability is obtained up to about 1,050° C. The heating is generally carried out in air, hydrogen, or in an inert atmosphere, such as argon, at a temperature of from about 800° F. to about 1,100° F.

The capacity of the recording tape of this invention to retain recorded information after exposure to elevated temperature, is illustrated by the following examples. In the examples, an Eico signal generator is used to determine signal retention. This generator supplies a sinusoidal current to a read-write head (Model AM-2, four-track stereo from Norton Associates, Inc., Hicksville, N.Y.). When the generator is in the write position, a signal is impressed on the tape by allowing the tape to pass just once under the read-write head, after which it is inspected by switching the head to the read position. If desired, the signal may be displayed on the vertical deflection plates of an oscilloscope while it is being inspected. A B-H loop tester is also used in evaluation. This apparatus was operated at 60 cycles per second and normally the loops were taken with a driving field 600 oersteds maximum, which was sufficient to determine the saturation magnetization.

All tapes were template-cut from 310 annealed stainless steel to the dimensions 0.001 by 0.24 by 30.0 inches. The tapes were then spliced with pressure-sensitive tape to form a loop. This yielded a splice length of 0.355 inches, which was a dropout area on the writing and readback of the tapes. The closed 30-inch tape loops were recorded on the above-described generator using the sinusoidal signal at 7.0 ma., 1,000 cycles per second writing current which was sufficient for signal saturation in all cases. All signals were read and photographed both before and after firing, with the retained signal amplitude being expressed as a percentage of the original signal amplitude. Since some of the initial signal values during some of the evaluations were low, it was determined that the input signal value should be weighed. Accordingly, a 2.0 cm., peak-to-amplitude (5 mv./cm.) was chosen as the reference value of 100 percent. Thus, a tape having, for example, an "input" of 100 percent and a retained signal of 50 percent would read back an amplitude of 1.0 cm., (+2.5 mv.), while another tape might have an original signal level of 20 percent with a retained signal also of 50 percent, which would be equivalent to 0.20 cm.±0.50 mv. All tapes were recorded and read at 10 inches per second.

In the data which follow the saturation induction (B*s*) and the residual induction (B*r*) of the tapes are expressed in gauss; and the coercive force (H*c*) is expressed in oersteds. All of the tapes were fired at 800° F. in hydrogen.

In the table, the magnetic coating layer was in each case deposited from a plating solution containing the following ingredients:

$CoSO_4 . 7H_2O$ —74 g./liter
$Na_3C_6H_5O_7 . 2 H_2O$ —110 g./liter
$(NH_4)_2 SO_4$ —44 g./liter
$NaH_2PO_2 . H_2O$ —15 g./liter
$NH_4OH$ (29%) —112 ml./liter

TABLE

| Example number | Layer | Material | Thickness inches | Hc | Br | Bs | Input signal, percent | Signal retenton, percent |
|---|---|---|---|---|---|---|---|---|
| 1 | Intermediate barrier layer | Zn | 24.2 | | | | | |
| | Magnetic coating layer | Co | 39.0 | 230, 250 | 9,700, 10,200 | 14,900, 15,500 | 52.4 | 78.8 |
| 2 | Intermediate barrier layer | Sn | 37.5 | | | | | |
| | Magnetic coating layer | Co | 64.0 | 200, 275 | 6,070, 7,350 | 8,620, 9,530 | 79.4 | 48.0 |
| 3 | Intermediate barrier layer | Pd | 24.3 | | | | | |
| | Magnetic coating layer | Co | 66.8 | 250, 200 | 10,400, 10,400 | 13,900, 13,000 | 71.5 | 35.6 |
| 4 | Intermediate barrier layer | Pd | 23.2 | | | | | |
| | Magnetic coating layer | Co | 59.8 | 280, 220 | 9,700, 11,100 | 12,600, 13,250 | 71.5 | 26.7 |
| 5 | Intermediate barrier layer | Au | 12.5 | | | | | |
| | Magnetic coating layer | Co | 63.5 | 300, 240 | 12,800, 14,250 | 16,500, 17,900 | 60.3 | 63.2 |
| 6 | Intermediate barrier layer | Zn | 6 | | | | | |
| | Magnetic coating layer | Co | 65 | 220, 250 | 14,000, 13,000 | 23,000, 20,000 | 87.0 | 65.8 |
| 7 | Intermediate barrier layer | Zn | 6 | | | | | |
| | Magnetic coating layer | Co | 144 | 260, 220 | 33,000, 36,000 | 46,000, 48,000 | 62.0 | 58.5 |
| 8 | Results [1] | | | 220, 220 | 36,000, 35,000 | 48,000, 48,000 | 100.0 | 80.2 |

[1] When the tape of Example 7 was fired a second time in hydrogen at 800° F.

When two lengths of each of the above-described tapes of examples 1 through 7 were thinly coated, one with tin and the other with chromium, the tapes performed well under oxidizing conditions at temperatures of over 1,000° F., as evidenced by the slight changes in weight observed.

In the present invention preferably the intermediate barrier layer is one which form an intermetallic compound on reaction at 800°- 1,100° F. As to the oxidation resistant barrier layer, the preferred coating is tin, which reacts with the magnetic coating at elevated temperature. While chromium is suitable as the oxidation resistant barrier layer at temperatures up to 1,000° F., it does not provide complete protection when this temperature is exceeded.

In general, the optimum configuration for the recording tapes of the present invention is a stainless steel substrate, an intermediate barrier layer composed of tin or zinc, a magnetic coating layer of cobalt approximately 100 μ inches in thickness, and an oxidation resistant barrier layer composed of tin. Signal retention is enhanced when the tape is treated initially at about 1,000° F. for about 10 minutes in the presence of argon or hydrogen to promote the formation of the intermetallic compound.

It will be apparent, however, that both mechanical and magnetic performance characteristics of the tape of this invention can be considerably varied. Accordingly, it will be understood that the present invention is to be limited solely by the lawful scope of the appended claims.

We claim:

1. A high-temperature magnetic recording tape comprising a stainless steel substrate, adhered to said substrate an intermediate barrier layer selected from the group consisting of zinc, tin, cadmium, silver, gold, platinum, mixtures of zinc and nickel, zinc and tin, tin and nickel, cadmium and nickel, zinc and cobalt, tin and cobalt, and cadmium and cobalt, adhered to said intermediate barrier layer a cobalt magnetic coating layer adapted to receive and retain recorded information, and an oxidation resistant barrier layer adhered to said magnetic coating layer and selected from the group consisting of zinc, tin, cadmium, silver, gold, platinum, chromium, mixtures of tin and nickel, zinc and nickel, zinc and tine, cadmium and nickel, zinc and cobalt, tin and cobalt, and cadmium and cobalt, said magnetic coating layer being at least 10 μ inches thicker than the combined thickness of said intermediate barrier layer and said oxidation-resistant barrier layer.

2. A high-temperature magnetic recording tape comprising a stainless steel substrate, adhered to said substrate an intermediate barrier layer for resisting the diffusion of foreign elements from the substrate, and adhered to said barrier layer a magnetic recording layer comprising cobalt and adhered to said magnetic coating layer an oxidation resistant barrier layer being comprised of chromium, said magnetic coating layer being at least 10 μ inches thicker than the combined thickness of said intermediate barrier layer and said oxidation-resistant barrier layer.

3. A high-temperature magnetic recording tape comprising a stainless steel substrate, an intermediate barrier layer comprising tin, adhered to said intermediate barrier layer a magnetic coating layer comprising cobalt and an oxidation resistant barrier layer adhered to said magnetic coating layer being comprised of tin, said magnetic coating layer being at least 10 μ inches thicker than the combined thickness of said intermediate barrier layer and said oxidation-resistant barrier layer.

4. A high-temperature magnetic recording tape comprising a stainless steel substrate, adhered to said substrate an intermediate barrier layer comprising zinc, adhered to said intermediate barrier layer a magnetic coating layer comprising cobalt, and adhered to said magnetic coating layer an oxidation resistant barrier layer comprising tin, said magnetic coating layer being at least 10 μ inches thicker than the combined thickness of said intermediate barrier layer and said oxidation-resistant barrier layer.